United States Patent
Kim (10) Patent No.: US 7,209,126 B2
(45) Date of Patent: Apr. 24, 2007

(54) VIEWING ANGLE-CONTROLLED DISPLAYS FOR POINT-OF-SALE TERMINALS AND METHODS FOR FABRICATING THE SAME

(75) Inventor: Andrew Kim, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 560 days.

(21) Appl. No.: 10/746,098

(22) Filed: Dec. 23, 2003

(65) Prior Publication Data
US 2005/0134575 A1    Jun. 23, 2005

(51) Int. Cl.
*G09G 5/00* (2006.01)
(52) U.S. Cl. .................................. 345/173; 428/1.1
(58) Field of Classification Search ................ 345/173; 178/18.01; D14/389; 428/1.1
See application file for complete search history.

(56) References Cited

U.S. PATENT DOCUMENTS

| | | | |
|---|---|---|---|
| 6,151,061 A * | 11/2000 | Tokuhashi | 348/51 |
| 6,765,550 B2 * | 7/2004 | Janick et al. | 345/87 |
| 2002/0114934 A1 | 8/2002 | Liu et al. | |
| 2003/0016327 A1 | 1/2003 | Kotchick et al. | |
| 2004/0130788 A1 * | 7/2004 | Minami | 359/601 |
| 2004/0189612 A1 * | 9/2004 | Bottari et al. | 345/173 |
| 2006/0045989 A1 * | 3/2006 | Minami | 428/1.1 |

FOREIGN PATENT DOCUMENTS

| | | |
|---|---|---|
| EP | 0 918 247 A | 5/1999 |
| EP | 1 184 713 A | 3/2002 |
| WO | WO 02/099479 A | 12/2002 |

OTHER PUBLICATIONS

Privacy Filters, Visiontek Systems LTD. [online]. [retrieved Dec. 22, 2003]. Retrieved from Internet: <URL: http://visionteksystems.co.uk/privacyfilters.htm>.
Fine Touch® [online] . [retrieved Dec. 15, 2003]. Retrieved from Internet: <URL: http://www.nissha.co.jp/english/el/el_01.html>.
Vikuiti™ Display Enhancement Films for Public Display Applications, 3M Electronic Display Lighting Optical Systems Division, St. Paul, MN.

* cited by examiner

*Primary Examiner*—Amr A. Awad
*Assistant Examiner*—Tom Sheng
(74) *Attorney, Agent, or Firm*—Ingrassia, Fisher & Lorenz, P.C.

(57) ABSTRACT

A display assembly for a point-of-sale terminal is provided. The display assembly has a liquid crystal display and a touch screen disposed overlying the liquid crystal display. The display assembly also has a viewing angle-controlled device disposed proximate to the touch screen. The viewing angle-controlled device is configured to limit the viewing angles at which said liquid crystal display may be viewed to a restricted range of viewing angles.

32 Claims, 5 Drawing Sheets

FIG. 6

VIEWING ANGLE-CONTROLLED DISPLAYS FOR POINT-OF-SALE TERMINALS AND METHODS FOR FABRICATING THE SAME

FIELD OF THE INVENTION

The present invention generally relates to data-capture systems used for payment transactions, and more particularly relates to point-of-sale or point-of-service (POS) transaction terminals with viewing angle-controlled displays.

BACKGROUND OF THE INVENTION

Figure 1:
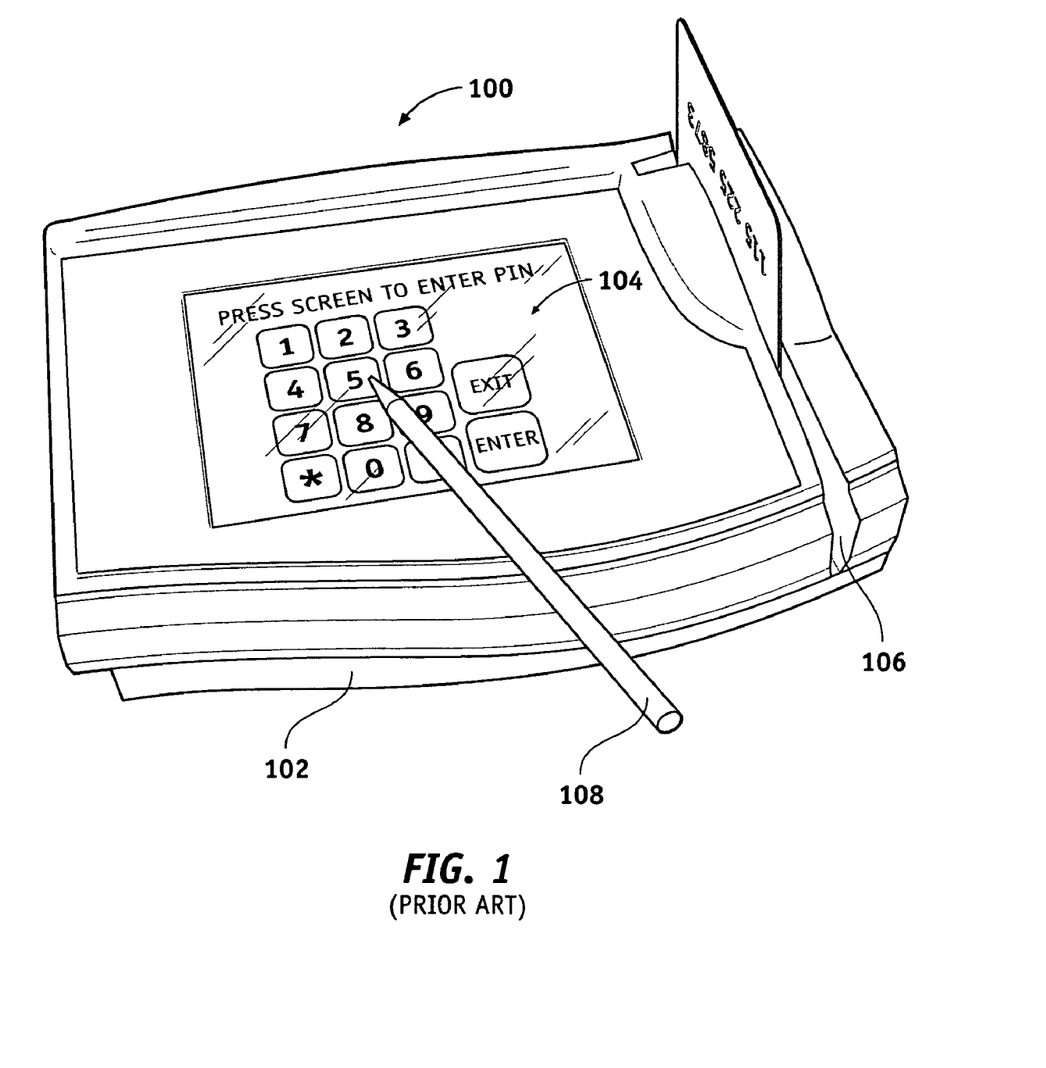
FIG. 1 is a schematic representation of a POS transaction terminal in the art.

Dedicated systems for facilitating point of sale transactions are known in the art, and indeed are familiar to most consumers in industrial countries. Such systems are commonly used when a consumer (or user) pays for a purchase, or is to receive a credit back, typically in conjunction with the consumer's credit card or debit card. FIG. 1 illustrates a point-of-sale and/or point-of-service ("POS") transaction terminal 100 in the art. POS transaction terminal 100 typically comprises a transaction computer 102, such as a CPU, operatively connected to a display 104.

With conventional credit cards or debit cards, at the time of purchase or credit, the card is moved through a magnetic stripe reader 106 of the POS terminal 100, and the encoded information on the magnetic stripe is read. To promote security, the consumer typically is required to enter some sort of personal identification number ("PIN") or a personal signature to help confirm that the consumer is indeed the authorized card owner. Entry is commonly made using display 104 of the POS terminal. Display 104 typically has a virtual (e.g., displayed) keypad interface, signature-capture interface, or other data-capture interface that is formed by the combination of a touch pad and a liquid crystal display ("LCD"). Display 104 can respond to pressure or touch from a passive style or pen 108 or from the consumer's finger, fingernail, keys or other such objects.

Figure 2:
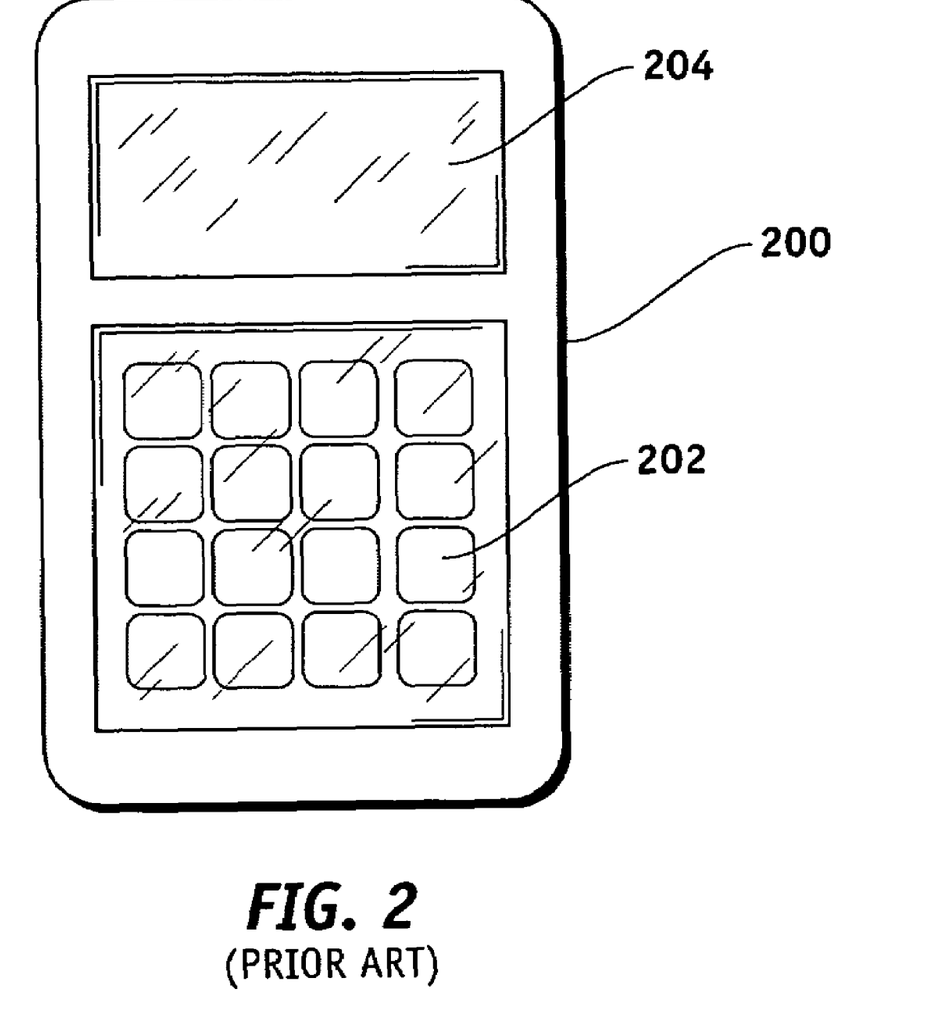
FIG. 2 is a schematic representation of another POS transaction terminal in the art.

Alternatively, referring to FIG. 2, the POS terminal may simply comprise a pin entry device ("PED") 200, which comprises a PIN entry display 202 coupled to a computer device, such as a CPU. PIN entry display 202 typically has a virtual keypad interface that is formed by the combination of a touch pad and an LCD. In this embodiment, a consumer's credit or debit card is moved through a magnetic strip reader of another device (not shown), such as a cash register, which is operably connected to PED 200. The consumer is then prompted by PED 200, such as via an LCD display 204, or by a product or service provider, to enter a PIN. The consumer may enter the PIN by touching or pressing on the virtual keys of PIN entry display 202.

Figure 3:
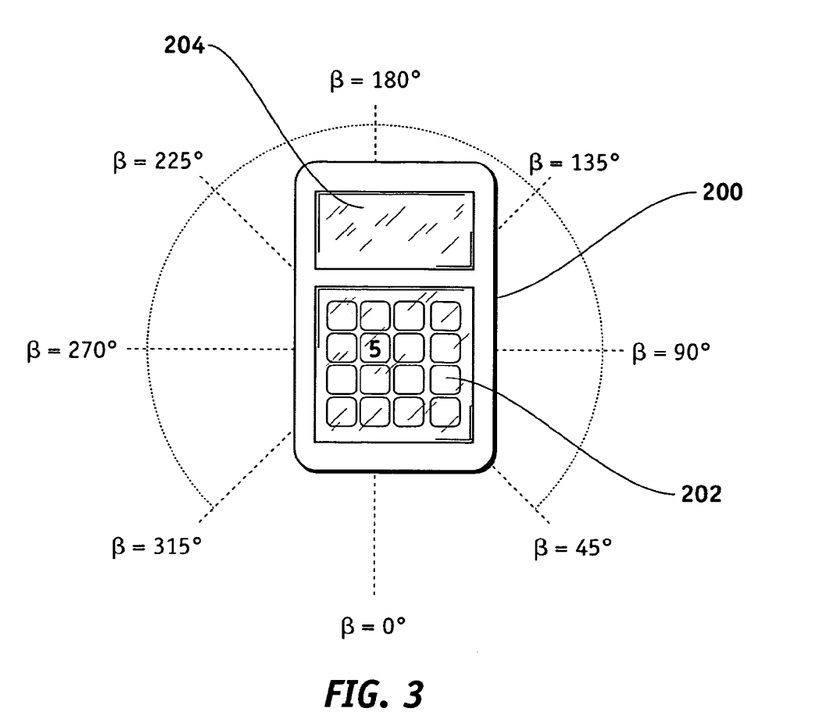
FIG. 3 is an illustration of the possible positions of a viewer about the periphery of the POS transaction terminal of FIG. 2.

During entry of such personal information by the consumer, the personal information may be subjected to theft by onlookers that can view POS terminal display 14 or PIN entry display 202 at an angle. FIG. 3 illustrates the various positions about a POS terminal, such as PIN entry device 200, at which an onlooker may be positioned to view PIN entry display 202. The position of the onlooker may be measured as having a position angle β about the "5" key of PIN entry display 202. A consumer using PIN entry device 200 typically stands facing PIN entry display 202, with position angle β being about zero degrees. An onlooker standing behind the consumer likely will not be able to view PIN entry display 202 because her view will be blocked by the consumer. However, an onlooker standing to the side of PIN entry device 200, such as when the onlooker is at a position angle β of about 45 to 135 degrees or about 225 to 315 degrees, or an onlooker standing across from the consumer, such as when the onlooker is at a position angle β of about 135 to 225 degrees, may be able to view PIN entry display 202 when the consumer is inputting her PIN.

To improve the security of POS transactions, POS terminals in the art may comprise a mechanical shield disposed about the terminal or the terminal display to limit the angles at which the terminal display may be viewed. However, such mechanical shields can increase the costs of the POS terminals. In addition, such mechanical shields may interfere with entry of data by the consumer.

Accordingly, it is desirable to provide a POS terminal display that limits the angles at which the display may be viewed. In addition, it is desirable to provide a POS terminal with a display having limited viewing angles. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

According to an exemplary embodiment of the present invention, there is provided a display assembly for a point-of-sale terminal. The display assembly comprises a liquid crystal display and a touch screen disposed overlying the liquid crystal display. A viewing angle-controlled device is disposed proximate to the touch screen. The viewing angle-controlled device is configured to limit viewing angles at which the liquid crystal display may be viewed to a restricted range of viewing angles.

According to another exemplary embodiment of the present invention, there is provided a display device for a point-of-sale terminal, the display device having a periphery. The display device comprises a liquid crystal display and a touch screen disposed overlying the liquid crystal display. A viewing angle-controlled device is disposed overlying the liquid crystal display. The viewing angle-controlled device is configured to limit about at least a portion of the periphery of the display device the angles at which the liquid crystal display may be viewed.

According to a further exemplary embodiment of the present invention, there is provided a point-of-sale transaction terminal. The point-of-sale transaction terminal comprises a computer device and a display assembly operably connected to the computer device. The display assembly is configured to permit entry of data into the computer device by touching the display assembly. The display assembly is further configured to limit to a restricted range of viewing angles the angles at which the display assembly may be viewed.

According to yet another exemplary embodiment of the present invention, there is provided a method for fabricating a display assembly for a point-of-sale terminal. The method comprises providing a liquid crystal display and positioning a touch screen overlying the liquid crystal display. A viewing angle-controlled device is disposed overlying the liquid crystal display. The viewing angle-controlled device limits viewing angles at which the liquid crystal display may be viewed to a restricted range of viewing angles.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 4:
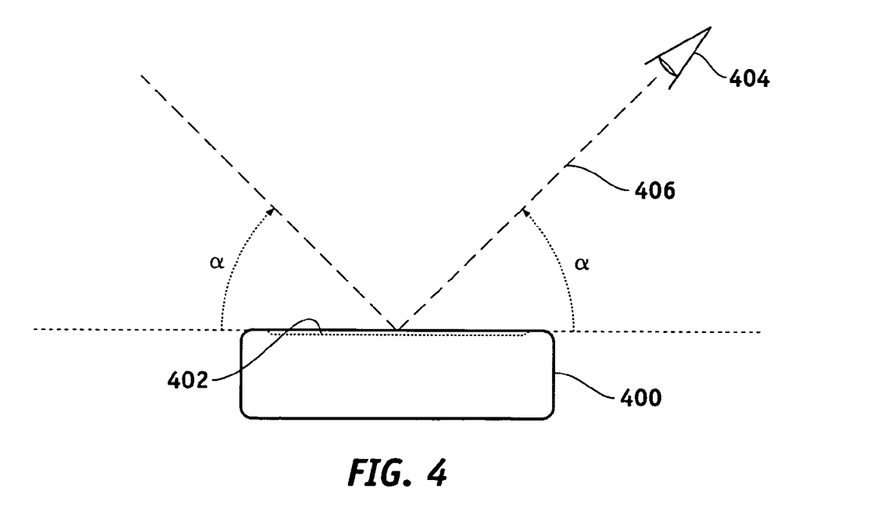
FIG. 4 is an illustration of the viewing angle of a viewer of a POS transaction terminal relative to the plane of the display of the POS transaction terminal.

The various embodiments of the present invention relate to a display for a POS transaction terminal that controls or limits the viewing angles at which the display can be viewed. FIG. 4 illustrates a POS terminal 400 having a viewing angle-controlled display 402 in accordance with any of the various embodiments of the present invention. A viewer 404 may be positioned about viewing angle-controlled display 402 at any position angle β, as described above with reference to FIG. 3, and may be able to view display 402 along a line of sight 406. The viewer's line of sight 406 is at a viewing angle α measured from the plane of display 402. As described in more detail below, viewing angle-controlled display 402 may control or restrict the viewing angles α at which viewer 404 may view display 402.

Figure 5:
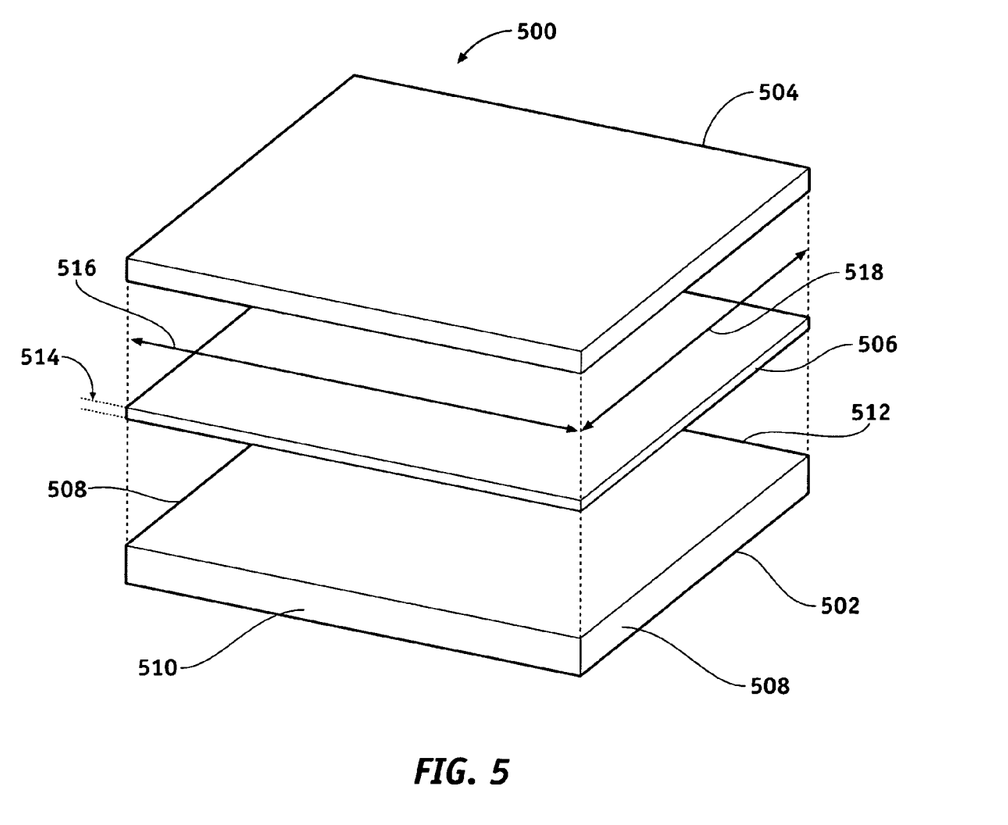
FIG. 5 is an exploded view of a display assembly in accordance with an exemplary embodiment of the present invention.

FIG. 5 is an exploded view of a viewing angle-controlled display 500 for a POS transaction terminal in accordance with one exemplary embodiment of the present invention. Viewing angle-controlled display 500 comprises an LCD 502. LCD 502 may comprise any suitable LCD device that is known in the payment transaction industry. LCD 502 preferably has a substantially uniform thickness and may have any suitable shape. In one exemplary embodiment, LCD 502 may have at least one front surface or boundary 510, at least two side surfaces or boundaries 508, and at least one back surface or boundary 512. Viewing angle-controlled display 500 also comprises a touch screen 504 that overlies LCD 502. Touch screen 504 may comprise any suitable pressure-sensitive or touch-sensitive pad or film known in the industry, such as, for example, 4-wire resistive touch screens, 5-wire resistive touch screens, capacitive touch screens, and ultrasonic touch screens. Examples of touch screens available in the industry include Fine Touch® touch screens manufactured by Nissha Company of Kyoto City, Japan, 4-Wire and 5-Wire touch screens manufactured by ITM, Inc. of Kyunggi-Do, Korea, and capacitive and resistive touch screens, such as the TouchPad™, available from Synaptics, Inc. of San Jose, Calif.

Viewing angle-controlled display 500 further comprises a viewing angle-controlled device 506. Viewing angle-controlled device 506 may be interposed between LCD 502 and touch screen 504, as illustrated in FIG. 5, or, alternatively, may overlie touch screen 504. Viewing angle-controlled device 506 may comprise any suitable type of film, layer or other mechanism that restricts or limits the range of viewing angles α at which LCD 502, and hence viewing angle-controlled display 500, may be viewed by an onlooker when the onlooker is positioned at a point about the periphery of viewing angle-controlled display 500. In one exemplary embodiment, the viewing angle-controlled device 506 may limit the viewing angles to a restricted range when the viewing angle controlled-display 500 is viewed from approximately one of the side surfaces 508 of LCD 502. In another exemplary embodiment of the invention, viewing angle-controlled device 506 may limit the viewing range at which LCD 502 may be viewed to a restricted range when the viewing angle-controlled display 500 is viewed from approximately a back surface 512 of LCD 502. In a further, preferred, exemplary embodiment of the invention, viewing angle-controlled device 506 may limit the viewing angles at which LCD 502 may be viewed to a restricted range when the viewing angle-controlled display 500 is viewed from approximately one of the side surfaces 508 and approximately one of the back surfaces 512 of LCD 502.

In one exemplary embodiment of the present invention, viewing angle-controlled device 506 may comprise a light control film that is interposed between LCD 502 and touch screen 504 and that does not interfere with the operation of touch screen 504. Examples of films or materials that may be suitable for forming a viewing angle-controlled film include, but are not limited to, Vikuiti® Light Control Film manufactured by 3M Corporation of St. Paul, Minn., and light control film and blur film available from VisionTek Systems, Ltd. of West Midlands, United Kingdom.

In another exemplary embodiment of the present invention, viewing angle-controlled device 506 may comprise a half-mirror coating that is disposed overlying touch screen 504. Examples of half-mirror coatings that may be suitable for forming viewing angle-controlled device 506 include, but are not limited to, half-mirror coatings available from ITM, Inc. of Kyunggi-Do, Korea.

Viewing angle-controlled device 506 may have any thickness 514 suitable to restrict or limit the range of angles at which LCD 502 may be viewed. In another embodiment of the present invention, viewing angle-controlled device 506 may have a width 516 and a length 518 that is at least as great as the width and length of LCD 502. In a preferred embodiment of the invention, viewing angle-controlled device 506 has a width 516 and length 518 that are approximately the same as the width and length of LCD 502.

LCD 502, viewing angle-controlled device 506 and/or touch screen 504 may be assembled using any suitable chemical or mechanical method. For example, in one exemplary embodiment LCD 502, viewing angle-controlled device 506 and touch screen 504 may be suitably aligned, as illustrated in FIG. 5, and may be restricted in movement relative to each other by a fastening device, such as screws, brackets, clamps and the like. In another exemplary embodiment, LCD 502 and/or touch screen 504 may be affixed to viewing angle-controlled device 506 using a suitable adhesive or adhesive tape. In yet another exemplary embodiment of the invention, viewing angle-controlled device 506 may be deposited as a coating, such as a half mirror coating, on LCD 502 and/or touch screen 504. Further, it will be appreciated that, while viewing angle-controlled device 506 is shown as an element separate from LCD 502 and touch screen 504, viewing angle-controlled device 506 may be an integral portion of LCD 502 or touch screen 504.

Figure 6:
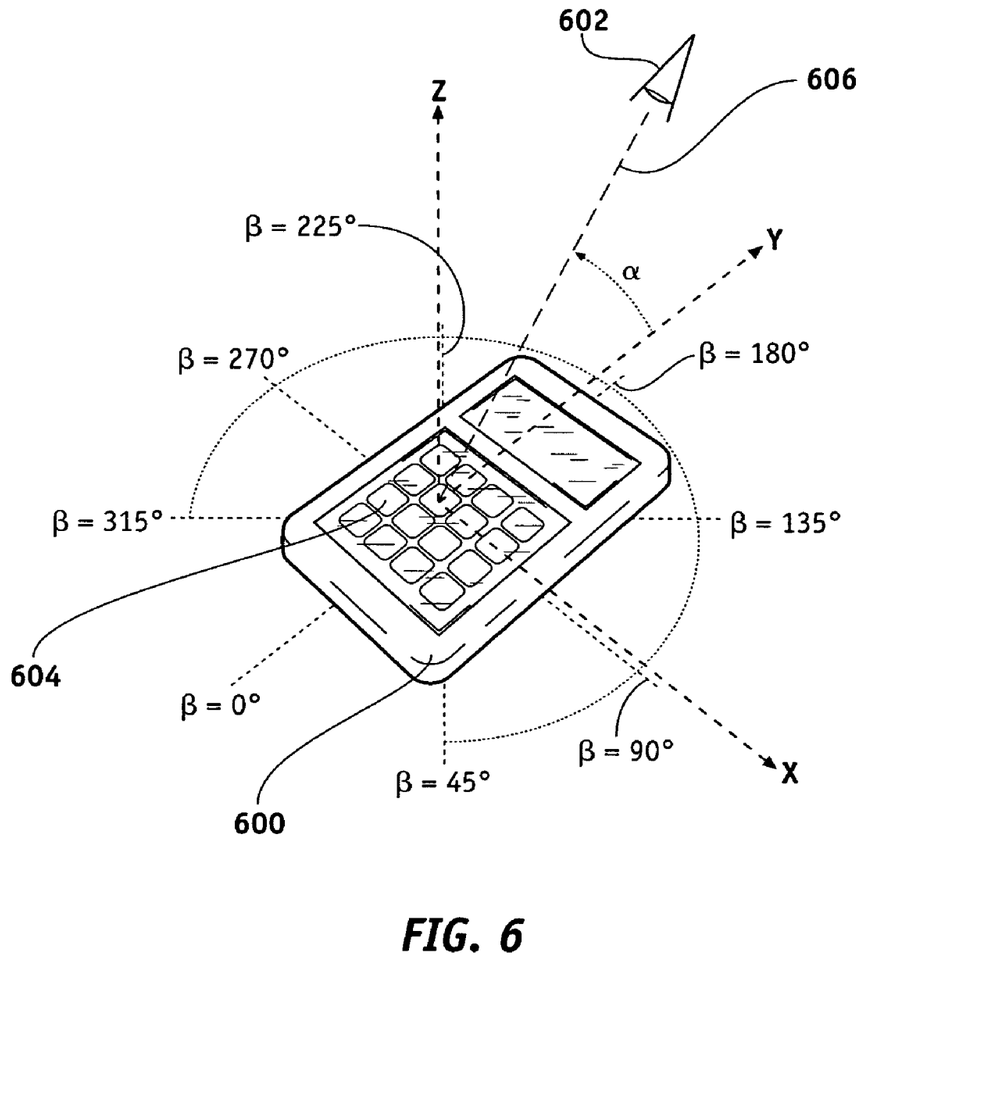
FIG. 6 is an illustration of the viewing angle of a viewer relative to various positions of the viewer about the periphery of a POS transaction terminal in accordance with various embodiments of the present invention.

As described above, viewing angle-controlled device 506 may restrict or limit the range of angles at which LCD 502 may be viewed by an onlooker depending on the position of the onlooker relative to the POS terminal. Referring to FIG. 6, an onlooker 602 may be disposed about the periphery of a POS terminal 600 having a viewing angle-controlled display 604 in accordance with the various embodiments of the present invention. As illustrated in FIG. 6, a point along the periphery of POS terminal 600, and hence, viewing angle-controlled display 604, may be measured as a position at a position angle $\beta$ that is measured in the plane of display 604, which for purposes of illustration may be the x-y plane, as illustrated in FIG. 6. Position angle $\beta$ is measured about an axis perpendicular to the plane of display 604, which for purposes of illustration may be the z-axis. Position angle $\beta$ is measured from a position $\beta=0$, which may lie along an axis that intersects the "5" and "8" keys of viewing angle-controlled display 604. Onlooker 602 may view display 604 along a line of sight 606 that is at a viewing angle $\alpha$ from the plane of display 604.

Preferably, when the onlooker is positioned at a position angle in the range of about $315° \leq \beta \leq 45°$, that is, when the onlooker is viewing display 604 from approximately the front boundary or surface of display 604, the viewing angle is not restricted, that is, the onlooker may view display 604 at any viewing angle in the range of $0 \leq \alpha \leq 90°$. However, it will be appreciated that the viewing angle may be restricted to any suitable range when the onlooker is positioned at a position angle in the range of about $315° \leq \beta \leq 45°$. In one embodiment of the invention, when the onlooker is positioned at a position angle in the range of about $45° \leq \beta \leq 315°$, the onlooker's viewing angle may be restricted to the range of about $25° \leq \alpha \leq 90°$. In a more preferred embodiment of the invention, when the onlooker is positioned at a position angle in the range of about $45° \leq \beta \leq 315°$, the onlooker's viewing angle may be restricted to the range of about $35° \leq \alpha \leq 90°$. In a more preferred embodiment of the invention, when the onlooker is positioned at a position angle in the range of about $45° \leq \beta \leq 90°$ or in the range of about $270° \leq \alpha \leq 315°$, the onlooker's viewing angle may be restricted to the range of about $35° \leq \alpha \leq 90°$ and when the onlooker is positioned at a position angle in the range of about $90° \leq \beta \leq 270°$, the onlooker's viewing angle may be restricted to the range of about $40° \leq \alpha \leq 90°$.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display assembly for a point-of-sale terminal having a periphery, comprising:
   a liquid crystal display;
   a touch screen disposed overlying said liquid crystal display; and
   a viewing angle-controlled device disposed proximate said touch screen, wherein said viewing angle-controlled device is configured to limit viewing angles at which said liquid crystal display may be viewed to a restricted range of viewing angles;
   wherein the periphery of the display assembly has at least two side boundaries and wherein said viewing angle-controlled device limits the angles $\alpha$ at which said liquid crystal display may be viewed to a range of about $35° = <\alpha = <90°$ when the display assembly is viewed from a position proximate to one of said at least two side boundaries; and
   wherein the periphery of the display assembly has at least one back boundary and wherein said viewing angle-controlled device limits the angles $\alpha$ at which said liquid crystal display may be viewed to a range of about $40° < \alpha < 90°$ when the display assembly is viewed from a position proximate to said at least one back boundary.

2. The display assembly for a point-of-sale terminal of claim 1, wherein said viewing angle-controlled device is integral with said touch screen.

3. The display assembly for a point-of-sale terminal of claim 1, wherein said viewing angle-controlled device is integral with said liquid crystal display.

4. The display assembly for a point-of-sale terminal of claim 1, wherein said viewing angle-controlled device is affixed to at least one of said liquid crystal display and said touch screen by a mechanical fastener.

5. The display assembly for a point-of-sale terminal of claim 4, wherein said mechanical fastener comprises at least one of screws, brackets, clamps, adhesive and adhesive tape.

6. The display assembly for a point-of-sale terminal of claim 1, wherein said viewing angle-controlled device is interposed between said liquid crystal display and said touch screen.

7. The display assembly for a point-of-sale terminal of claim 6, wherein said viewing angle-controlled device comprises a light control film.

8. The display assembly for a point-of-sale terminal of claim 1, wherein said viewing angle-controlled device is a half mirror coating that is deposited on said touch screen.

9. The display assembly for a point-of-sale terminal of claim 1, wherein said restricted range of viewing angles comprises viewing angles $\alpha$ in the range of about $35° \leq \alpha \leq 90°$ when the display is viewed from a position angle $\beta$ in the range of one of about $45° \leq \beta \leq 90°$ and about $270° \leq \beta \leq 315°$, where $\beta$ is measured in a plane of the display assembly and about an axis perpendicular to the display assembly.

10. The display assembly for a point-of-sale terminal of claim 1, wherein said restricted range of viewing angles comprises viewing angles $\alpha$ in the range of about $40° \leq \alpha \leq 90°$ when the display is viewed from a position angle $\beta$ in the range of about $90° \leq \beta \leq 270°$, where $\beta$ is measured in a plane of the display assembly and about an axis perpendicular to the display assembly.

11. A display device for a point-of-sale terminal, the display device having a periphery, wherein the display device comprises:

a liquid crystal display;
a touch screen disposed overlying said liquid crystal display; and
a viewing angle-controlled device disposed overlying said liquid crystal display;
wherein said viewing angle-controlled device is configured to limit about at least a portion of the periphery of the display device the angles at which said liquid crystal display may be viewed;
wherein the periphery of the display device has at least two side boundaries and wherein said viewing angle-controlled device limits the angles a at which said liquid crystal display may be viewed to a range of about $35°=<\alpha=<90°$ when the display device is viewed from a position proximate to one of said at least two side boundaries; and
wherein periphery of the display device has at least one back boundary and wherein said viewing angle-controlled device limits the angles $\alpha$ at which said liquid crystal display may be viewed to a range of about $40°=<\alpha<90°$ when the display device is viewed from a position proximate to said at least one back boundary.

12. The display device for a point-of-sale terminal of claim 11, wherein said viewing angle-controlled device is integral with said touch screen.

13. The display device for a point-of-sale terminal of claim 11, wherein said viewing angle-controlled device is integral with said liquid crystal display.

14. The display device for a point-of-sale terminal of claim 11, wherein said viewing angle-controlled device is affixed to at least one of said liquid crystal display and said touch screen by a mechanical fastener.

15. The display device for a point-of-sale terminal of claim 14, wherein said mechanical fastener comprises at least one of screws, brackets, clamps, adhesive and adhesive tape.

16. The display device for a point-of-sale terminal of claim 11, wherein said viewing angle-controlled device is interposed between said liquid crystal display and said touch screen.

17. The display device for a point-of-sale terminal of claim 16, wherein said viewing angle-controlled device comprises a light control film.

18. The display device for a point-of-sale terminal of claim 11, wherein said viewing angle-controlled device comprises a half mirror coating that is deposited overlying said touch screen.

19. A point-of-sale transaction terminal having a periphery comprising:
a computer device; and
a display assembly operably connected to said computer device, wherein said display assembly is configured to permit entry of data into said computer device by touching said display assembly and wherein said display assembly is configured to limit to a restricted range of viewing angles the angles at which said display assembly may be viewed;
wherein the periphery of the transaction terminal has at least two side boundaries and wherein said restricted range of viewing angles limits the angles $\alpha$ at which said liquid crystal display may be viewed to a range of about $35°=<\alpha=<90°$ when the display device is viewed from a position proximate to one of said at least two side boundaries; and
wherein the periphery of the transaction terminal has at least one back boundary and wherein said restricted range of viewing angles limits the angles $\alpha$ at which said liquid crystal display may be viewed to a range of about $40°=<\alpha=<90°$ when the display device is viewed from a position proximate to said at least one back boundary.

20. The point-of-sale transaction terminal of claim 19, wherein said display assembly comprises:
a liquid crystal display;
a touch screen disposed overlying said liquid crystal display; and
a viewing angle-controlled device disposed proximate to said touch screen, wherein said viewing angle-controlled device is configured to permit the liquid crystal display to be viewed at said restricted range of viewing angles.

21. The point-of-sale transaction terminal of claim 20, wherein said viewing angle-controlled device is integral with said touch screen.

22. The point-of-sale transaction terminal of claim 20, wherein said viewing angle-controlled film is affixed to at least one of said liquid crystal display and said touch screen by a mechanical fastener.

23. The point-of-sale transaction terminal of claim 20, wherein said viewing angle-controlled film is interposed between said liquid crystal display and said touch screen.

24. The point-of-sale transaction terminal of claim 23, wherein said viewing angle-controlled film comprises a light control film.

25. The point-of-sale transaction terminal of claim 20, wherein said viewing angle-controlled film comprises a half mirror coating tat is deposited on said touch screen.

26. A method for fabricating a display assembly for a point-of-sale terminal, the method comprising:
providing a liquid crystal display;
positioning a touch screen overlying said liquid crystal display; and
disposing a viewing angle-controlled device overlying said liquid crystal display, wherein said viewing angle-controlled device limits viewing angles at which said liquid crystal display may be viewed to a restricted range of viewing angles;
wherein the periphery of the display assembly has at least two side boundaries and wherein said restricted range of viewing angles limits the angles $\alpha$ at which said liquid crystal display may be viewed to a range of about $35°=<\alpha=<90°$ when the display device is viewed from a position proximate to one of said at least two side boundaries; and
wherein the periphery of the transaction terminal has at least one back boundary and wherein said restricted range of viewing angles limits the angles $\alpha$ at which said liquid crystal display may be viewed to a range of about $40°=<\alpha=<90°$ when the display device is viewed from a position proximate to said at least one back boundary.

27. The method of claim 26, wherein said viewing angle-controlled device is integral with said touch screen and wherein the step of positioning said touch screen overlying said liquid crystal display and the step of disposing said viewing angle-controlled device overlying said liquid crystal display are performed at the same time.

28. The method of claim 26, further comprising the step of affixing said liquid crystal display, said viewing angle-controlled device, and said touch screen.

29. The method of claim 28, wherein the step of affixing said liquid crystal display, said viewing angle-controlled device, and said touch screen comprises affixing said liquid crystal display, said viewing angle-controlled device, and said touch screen utilizing a mechanical fastener.

30. The method of claim 29, wherein the step of affixing said liquid crystal display, said viewing angle-controlled device and said touch screen utilizing a mechanical fastener comprises affixing said liquid crystal display, said viewing angle-controlled device, and said touch screen utilizing at least one of screws, brackets, clamps, adhesive, and adhesive tape.

31. The method of claim 26, wherein the step of disposing said viewing angle-controlled device overlying said liquid crystal display comprises interposing said viewing angle-controlled device between said liquid crystal display and said touch screen.

32. The method of claim 26, wherein the step of disposing said viewing angle-controlled device overlying said liquid crystal display comprises depositing said viewing angle-controlled device on said touch screen.

* * * * *

UNITED STATES PATENT AND TRADEMARK OFFICE
CERTIFICATE OF CORRECTION

PATENT NO.        : 7,209,126 B2
APPLICATION NO.   : 10/746098
DATED             : April 24, 2007
INVENTOR(S)       : Andrew Kim It is certified that error appears in the above-identified patent and that said Letters Patent is hereby corrected as shown below:

Column 6, line 23, "40°<α<90°" should be changed to --40°=<α=<90°--;

Column 7, line 12, "angles a at" should be changed to --angles at--;

Column 7, line 21, "40°=<α<90°" should be changed to --40°=<α=<90°--;

Column 8, line 32, "tat" should be changed to --that--.

Signed and Sealed this

Eighth Day of April, 2008

JON W. DUDAS
*Director of the United States Patent and Trademark Office*